United States Patent
Ballew et al.

(10) Patent No.: US 12,519,749 B2
(45) Date of Patent: Jan. 6, 2026

(54) INTERNET ADDRESS MANAGEMENT SYSTEMS AND METHODS

(71) Applicant: CenturyLink Intellectual Property LLC, Broomfield, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 296 days.

(21) Appl. No.: 18/338,100

(22) Filed: Jun. 20, 2023

(65) Prior Publication Data

US 2024/0031329 A1 Jan. 25, 2024

Related U.S. Application Data

(60) Provisional application No. 63/368,813, filed on Jul. 19, 2022.

(51) Int. Cl.
    *H04L 61/5014* (2022.01)
(52) U.S. Cl.
    CPC ............................ *H04L 61/5014* (2022.05)
(58) Field of Classification Search
    CPC .................................................. H04L 61/5014
    See application file for complete search history.

(56) References Cited

U.S. PATENT DOCUMENTS

| | | | | |
|---|---|---|---|---|
| 2007/0276905 | A1* | 11/2007 | Durand | H04L 67/52 709/203 |
| 2018/0007125 | A1* | 1/2018 | Onno | H04L 41/0895 |
| 2024/0236037 | A1* | 7/2024 | Jiang | H04L 41/40 |

OTHER PUBLICATIONS

Alexander, Steve et al., "DHCP Options and BOOTP Vendor Extensions", Network Working Group, RFC 2132 Mar. 1997, 34 pgs.
Droms, Ralph, "Dynamic Host Configuration Protocol", Network Working Group, RFC 2131 Mar. 1997, 45 pgs.

* cited by examiner

*Primary Examiner* — Suraj M Joshi (57) ABSTRACT

Systems and methods for simplifying the assignment and management of IP addresses are provided. In examples, a DHCP relay agent system receives an IP address request or similar discover message from a client computing device and forwards the request to one or more DHCP servers. In addition to forwarding the request, the DHCP relay agent system may be configured to append and forward information related to the DHCP negotiation process to a DHCP server. For example, the indication of operations may include executable instructions, such as opcodes, that facilitate the offer of an IP address lease. Parameters necessary for executing the operations, such as operands, may also be appended. In examples, the DHCP server may effectively operate as a processor, virtual processor, or virtual machine in the lease negotiation process, where IP address assignment or management decisions are pre-defined by the configuration information of the DHCP relay agent system.

20 Claims, 4 Drawing Sheets

INTERNET ADDRESS MANAGEMENT SYSTEMS AND METHODS

CROSS-REFERENCE TO RELATED APPLICATIONS

This application claims the benefits of U.S. Provisional Application No. 63/368,813, filed Jul. 19, 2022, entitled "Internet Address Management Systems and Methods," which is incorporated herein by reference in its entirety.

BACKGROUND

Dynamic host configuration protocol (DHCP) servers dynamically issue internet protocol (IP) addresses to various requesting computing devices. However, a DHCP server can quickly become overburdened or unexpectedly fail. In either case, services provided by the DHCP server may be disrupted and cause internet connectivity issues with computing devices to which the DHCP server has provided, or is configured to provide, IP addresses. It is with respect to this general environment to which present aspects are directed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In aspects, the present application discloses a method. In examples, the method may require receiving, at a DHCP relay agent system, configuration information for the DHCP relay agent system; receiving, at the DHCP relay agent system, a DHCP discover message from a client device; determining, by the DHCP relay agent system and based on the configuration information, operations to be performed by a DHCP server in order to respond to the discover request and parameters for the operations; sending an indication of the operations and the parameters to at least a first DHCP server; receiving, from the DHCP server, an offer for an IP address from the first DHCP server; forwarding the offer to the client device; receiving, from the client device, a request for the IP address; receiving an indication of a lease for the IP address; and forwarding the indication of the lease to the client device.

In aspects, the present application also discloses another method, comprising: receiving, at a first dynamic host configuration protocol (DHCP) server, a DHCP client device discover message from a DHCP relay agent system; receiving, at the first DHCP server, an indication of operations to be performed by the first DHCP server, and parameters associated with the operations, from the DHCP relay agent system; executing, by the first DHCP server, the operations using the parameters; and responding to the received client device discover message with an offer for an internet protocol (IP) address lease, based on executing the operations.

In aspects, the present application also discloses a system, comprising at least one processor, and memory, operatively connected to the at least one processor and storing instructions that, when executed by the at least one processor, cause the system to perform a method. In aspects, the method comprises: receiving configuration information at a dynamic host configuration protocol (DHCP) relay agent; receiving, by the DHCP relay agent, a DHCP discover message from a client device; determining, by the DHCP relay agent and based on the configuration information, operations to be performed by a DHCP server in order to respond to the discover request; determining parameters associated with the operations; sending, by the DHCP relay agent, an indication of the operations and the parameters to at least a first DHCP server; receiving, by the DHCP relay agent, an offer for an internet protocol (IP) address from the first DHCP server; forwarding, by the DHCP relay agent, the offer to the client device; receiving, from the client device, a request for the IP address; receiving, by the DHCP relay agent, an indication of a lease for the IP address; and forwarding, by the DHCP relay agent, the indication of the lease to the client device.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a local area network (LAN), when a computing device does not have an IP address, the computing device may request an IP address from a DHCP server. For example, when a computing device boots up or connects to a particular network for the first time, the computing device may broadcast an IP address request via the LAN. The IP address request is typically transmitted to one or more DHCP server. In response to receiving the request, the DHCP server generates an offer that includes an available IP address. The offer is then transmitted to the requesting computing device and the computing device can either accept or reject the offer. In other contexts, a computing device may seek to renew an IP address already held by the computing device and issued by a DHCP server.

The request for the IP address may be received by a number of different DHCP servers. For example, two different DHCP servers may receive the request and each DHCP server may respond with a different offer (e.g., each DHCP server may respond with a different IP address). When the computing device receives the offers, the computing device selects one of the offers (e.g., the offer that the computing device received first). The offer that was not accepted is withdrawn by the DHCP server that submitted it.

In a wide area network (WAN), similar events may occur. For example, in a WAN, when a computing device broadcasts a request for an IP address, the broadcast may be intercepted by a DHCP relay agent system of an access provider. In examples, the DHCP relay agent system is instantiated on the same LAN as the computing device and is connected to the WAN. The DHCP relay agent system forwards the broadcasted request to one or more IP address associated with a DHCP server connected to the WAN. When the DHCP server receives the request, the DHCP server may respond with an offer. In an example, the offer may be in the form of a broadcast or the offer may be sent directly to the computing device through the DHCP relay system.

In some examples, the access provider may have access to two or more DHCP servers. In such an example, the access provider may convert the broadcast provided by the computing device to multiple requests and send each DHCP server in the server cluster the request. In some configurations, both DHCP servers share the same pool of IP addresses. As such a first DHCP server may have access to a first block of IP addresses in the pool of IP addresses and a second DHCP server may have access to a second block of IP addresses in the pool of IP addresses. For example, a pool of IP addresses may have a total of two-hundred and fifty-six available IP addresses. In this example, the first DHCP server may have access to IP addresses 0-127 while the second DHCP server may have access to IP addresses 128-255.

When the request is received by the first DHCP server and the second DHCP server, each DHCP server may analyze the request and determine, based on the DHCP server configuration, whether and how it will respond to the request. For example, based on a media access control (MAC) address associated with the request, the first DHCP server may determine that it should respond to the request and the second DHCP server may determine that it should not respond to the request. Accordingly, the first DHCP server will send an offer, including an IP address from its block of available IP addresses, to the requesting computing device. Meanwhile, the second DHCP server will not submit an offer to the requesting computing device. When the offer from the first DHCP server is received, the computing device may accept the offer and subsequently be provided access to the network through the typical DHCP discover, offer, request, acknowledge (DORA) process.

IP addresses are typically leased for a period of time (e.g., twenty-four hours). As such, the lease on a particular IP address needs to be periodically renewed. The renewal of an IP address lease is typically handled by the DHCP server that originally issued the IP address, but that may also be changed based on DHCP server configuration settings.

However, problems with the initial assignment of IP addresses and the renewal of those IP addresses arise when one or more DHCP servers are inoperable. For example, if the first DHCP server goes down but is supposed to respond to a particular request and/or a particular renewal request, the second DHCP server will only respond to the request after a particular amount of time has passed.

When the first DHCP server comes back online, a reconciliation process occurs between the first DHCP server and the second DHCP server. During the reconciliation process, the first DHCP server may check an IP address lease database that is shared with the second DHCP server. The lease database has the most up to date information about available IP addresses, lease periods etc. Additionally, the first DHCP server may communicate with the second DHCP server to ensure that the first DHCP server has record of all IP address renewals and/or issuances that occurred while the first DHCP was inoperable. This helps ensure that the same IP address is not issued to two or more different computing devices. During this reconciliation process, the first DHCP server will neither issue new IP addresses to requesting computing devices nor renew a lease on an IP address. Again, the reconciliation process may be controlled via DHCP server configuration settings on both of the first and second DHCP servers.

Additionally, the example scenarios get more complicated and complex as additional DHCP servers are added to a DHCP server cluster. Configurations of the DHCP servers must be kept up to date and in synch, which can be complex and subject to failures.

In examples, the present application describes systems and methods for simplifying the assignment and management of IP addresses on a computing network. In examples, a DHCP relay agent system receives an IP address request or similar discover message from a client computing device and forwards the request to one or more DHCP servers, as described above. In addition to forwarding the request, however, the DHCP relay agent system may be configured to append and forward information related to the DHCP negotiation process to a DHCP server. The appended information may provide an indication of operations for a DHCP server to perform as it processes the IP address request. For example, the indication of operations may include executable instructions, such as opcodes, that facilitate the offer of an IP address lease. Parameters necessary for executing the operations, such as operands, may also be appended. The indication of operations may inform a DHCP server about how to allocate addresses to client devices on the network from its pool of assignable addresses, or may instruct a DHCP server to obtain an IP address from a specific server on the network. The decision-making burden on the DHCP server is thereby reduced, since the DHCP server merely performs the operations indicated by the DHCP relay agent system. In examples, the DHCP server may effectively operate as a processor, virtual processor, or virtual machine in the lease negotiation process, where IP address assignment or management decisions are pre-defined by the configuration information provided to the DHCP relay agent system.

Furthermore, in examples, DHCP server outages may be more easily managed. For example, an inoperable DHCP server may be quickly recognized by a DHCP relay agent system and, based on the DHCP relay agent system configuration, IP address requests may be routed to another DHCP server on the network. This approach may drastically reduce the access latencies experienced by client devices during a server outage, especially on larger, complex networks, and may reduce the need to keep DHCP server configuration settings up to date and in synch. Additional details and examples are now provided via discussion of the figures.

Figure 1:
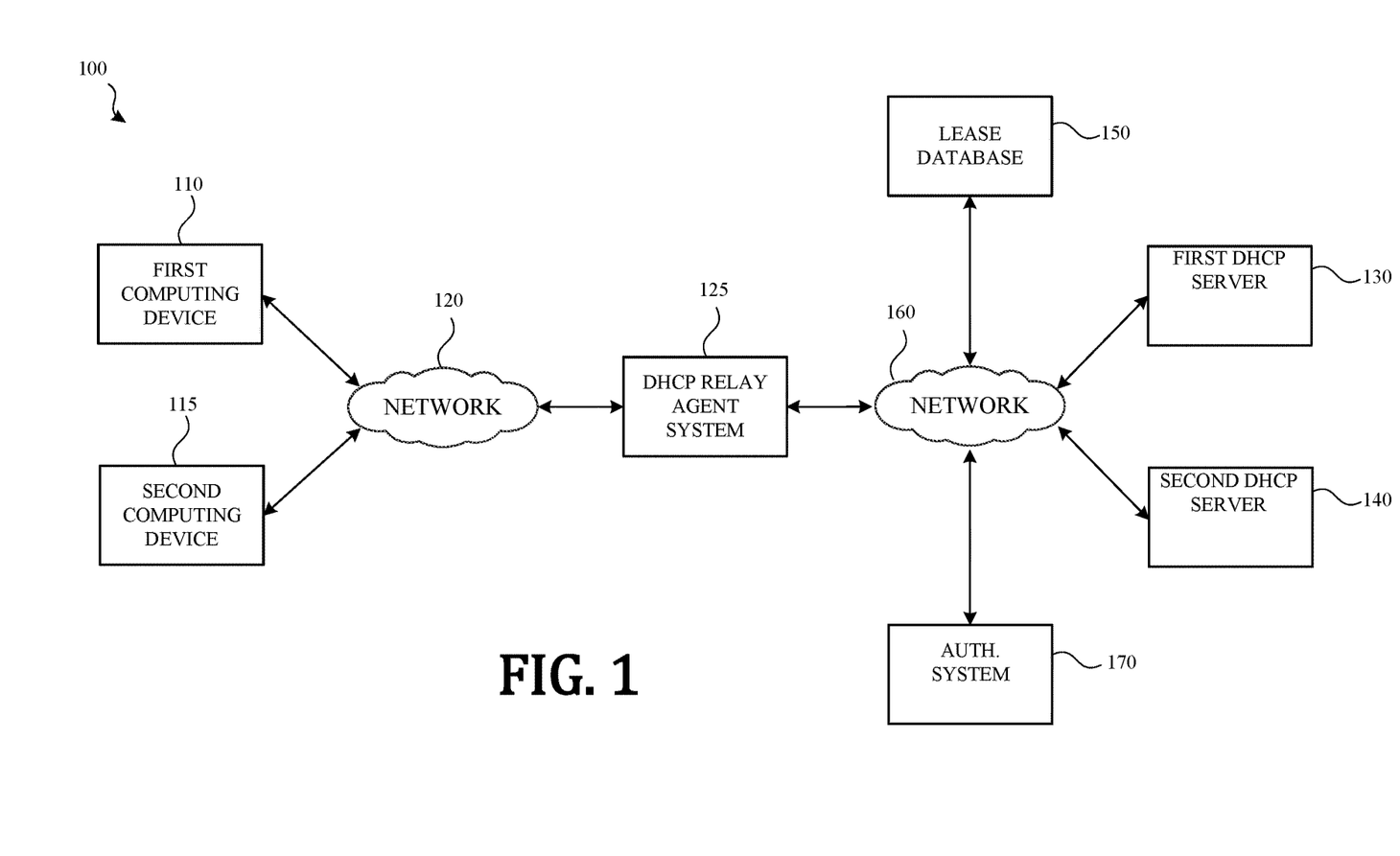
FIG. 1 depicts an example computer network system.

FIG. 1 depicts an example of a computer network system 100 where a first computing device 110 and a second computing device 115 are connected to a DHCP relay agent system 125 through a network 120. The first and second computing devices 110 and 115 may be any of a desktop or laptop computer; a mobile device, such as a mobile phone or tablet; a personal digital assistant (PDA); or any similar client device capable of network connection. The first and second computing devices 110 and 115 may connect to the network 120 via wired or wireless means. For example, an ethernet cable may be used to provide a wired connection to the network 120, or in other examples the first and second computing devices 110 and 115 may connect to the network 120 wirelessly, such as through WiFi or another wireless network technology.

The network 120 may comprise a LAN, a WAN, or any node-based interconnection of computer resources established via wired, fiber optic, or wireless methodologies, arranged in any of a wide variety of accepted networking topologies. This interconnection may be supported by a range of computer hardware systems such as servers, routers, switches, or other types of computer resources. In some examples, network 120 may be established in a common physical location such as in a home or on the premises of a business. In other examples, a network 120 may interconnect computer resources located in disparate geographies. As such, the elements depicted in the computer network system 100 may not be physically collocated.

The DHCP relay agent system 125 may be implemented through a variety of computer configurations. For example, the DHCP relay agent system 125 may itself be a server or similar resource that provides services on the computer network system 100. In other examples, the DHCP relay agent system 125 may be a single computer, computer cluster, or other distributed computing resource. The DHCP relay agent system 125 may have access to data storage media such as, but not limited to, local hard drives or similar memory elements, network attached storage (NAS), storage area networks (SANs), cloud storage, or other local or remote data storage elements (not depicted in FIG. 1). Thus, the DHCP relay agent system 125 is capable of receiving, storing, and retrieving configuration information that may be used by connected DHCP servers, such as first server 130 and second server 140 during a DHCP lease negotiation.

In the example computer network system 100 depicted in FIG. 1, the DHCP relay agent system 125 is operatively connected through network 160 with a first server 130, a second server 140, a lease database 150, and an authentication (auth.) system 170. In examples, first server 130 and second server 140 are each configured to operate as a DHCP server. Similar to network 120, network 160 may comprise a range of computer hardware systems such as servers, routers, switches, or other types of computing systems that are interconnected via wired, fiber optic, or wireless methodologies, arranged in any of a wide variety of accepted networking topologies. However, network 160 may comprise computing systems that are more widely geographically distributed than network 120. In some examples, network 120 may comprise a LAN and network 160 may comprise a WAN or other type of network structure where computing systems on the network are not physically proximal. In examples, network 160 may comprise computing systems that are interconnected via the Internet.

The first server 130 or second server 140 may receive an IP address request initiated by the first or second computing devices 110 or 115 forwarded from the DHCP relay agent system 125. The first and second servers 130 and 140 may also receive an indication of operations appended by the DHCP relay agent system 125, which are to be performed by the first or second servers 130 or 140 in assigning the IP address. In some examples, the first or second server 130 or 140 may assign an IP address based on the received indication of operations, or the first or second server 130 or 140 may check with each other, or another server, or may check with a local or remote lease database 150 in assigning the IP address. In other examples, based on the received indication of operations, the first or second server 130 or 140 may communicate with an authentication server 170 to verify the credentials of the first or second computing devices 110 or 115. The lease database 150 and authentication system 170 may each be a single computer, a server, a computer cluster, multiple servers, or other distributed computing resource. The lease database 150 and authentication system 170 may each have access to data storage media such as, but not limited to, local hard drives or similar memory elements, network attached storage (NAS), storage area networks (SANs), cloud storage, or other local or remote data storage elements (not depicted in FIG. 1).

The following comprise nonexclusive examples of operations which may be performed within the computer network system 100. The DHCP relay agent system 125 may receive a broadcast IP address request from the first computing device 110, which transmits the broadcast request on port 68 to IP address 0.0.0.0 from address 0.0.0.0. The DHCP relay agent system 125 monitors port 67 where it receives the broadcast request. Because broadcast requests to address 0.0.0.0 are not supported by routers, which may be present within network 160, the DHCP relay agent system 125 intercepts the broadcast and relays network traffic associated with the IP address request on behalf of the first computing devices 110. For example, the DHCP relay agent system 125 may receive the broadcast IP address request from the first computing device 110; based on its configuration, append an indication of operations (and associated parameters) for the first or second server 130 or 140 to use in responding to the request; and forward the IP address request and the indication of operations to an anycast address, which may be advertised on the network 160 by the first and/or second server 130 and/or 140. In examples, the network 160 may be comprised of routing devices that route the request to the topographically closest first server 130 or second server 140 that advertises the anycast address. In examples, the DHCP relay agent system 125 (and network 160) may forward the IP address request and the indication of operations (and associated parameters) to the first server 130 for execution. The first server 130 then performs the indicated operations to complete the IP address lease negotiation process, and the DHCP relay agent system 125 relays associated network traffic between the first server 130 and the first computing device 110 in support of this process.

In other examples, the DHCP relay agent system 125 (and network 160) may forward the IP address request and the indication of operations (and associated parameters) to any DHCP server connected to network 160, using any network IP addressing and routing methodology in which the computer network system 100 is configured to operate. Examples include unicast, broadcast, multicast, or other related methodology.

The indication of operations appended to the IP address request by the DHCP relay agent system 125 may be defined by the configuration information provided to the DHCP relay agent system 125. The configuration information may be provided to the DHCP relay agent system 125 through a network administrator user interface, programmatically from a data store or other computing device, or by any other computing resource in communication with the DHCP relay agent system 125. The configuration information comprises any information that the DHCP relay agent system 125 may use when forwarding an IP address request from a computing device (such as a first computing device 110 or second computing device 115) to a DHCP server (such as a first or second server 130 or 140). For example, the configuration information may include information about the IP addresses available to the first computing device 110 or second computing device 115 and how those IP addresses should be assigned to client computing devices having the characteristics of the first computing device 110 or second computing device 115, respectively.

The configuration information may further include a description or list of operations to be performed by a DHCP server (such as a first or second server 130 or 140) as it responds to the IP address request. The description or list of operations may include actual executable instructions. For example, the configuration information may contain a list of opcodes and associated operands that the DHCP relay agent system 125 may forward to a DHCP server for execution. The following table provides nonexclusive example opcodes and associated operands that represent a sample of possible opcodes and operands that may be forwarded to a DHCP server. A description of these example opcodes and operands follows the table.

| OPCODE | OPERANDS |
|---|---|
| NODB | [ ] |
| USEDB | [= [PROTO:] HOST [:PORT] ] |
| SETOPT | [= OPT:VALUE ] |
| GETOPT | [= OPT:SUBOPT [:INDEX] ] |
| OFFER | [= IP [ [:MASK] \| [/CIDR] ] ] |
| RETRIEVE | [= HOST [:PORT] ] |
| NOTIFY | [= HOST_1 [:PORT_1] [, HOST_N [:PORT_N] ] ] |
| AUTH | [= [PROTO:] HOST [:PORT] [* CREDENTIALS] ] |
| PING | [= HOST] |
| REDIR | [= HOST [:PORT] ] |
| RELEASE | [= MACADDR \| CLIENT_IDENTIFIER ] |
| SETVAR | [= VARNAME : VALUE ] |
| GETVAR | [= VARNAME ] |
| REMOVE | [= VARNAME [:VALUE] ] |
| EXISTS | [= VARNAME ] |
| OUI | [= VENDOR_WILDCARD ] |
| AND | [(EXPR_1) (, [EXPR_N]) ] |
| OR | [(EXPR_1) [: (EXPR_N)] ] |
| NOT | [( EXPR )] |
| SUBSTR | [= QUOTED_STRING : START : LENGTH ] |
| LENGTH | [= QUOTED_STRING \| EXPR ] |
| IIF | [ (EXPR) ? EXPR_IF_TRUE : EXPR_IF_FALSE ] |

In the non-exclusive examples described above, the opcode NODB indicates that the DHCP server should not check a lease database when assigning an IP address to a client computing device (such as a first or second computing device 110 or 115), and thus, no centralized record of the lease transaction is required to be maintained. The opcode USEDB indicates that the DHCP server should use a specific lease database when extending an IP address lease offer, with the associated operands indicating the port of the lease database and which protocol to use when communicating with the lease database. The opcode SETOPT specifies that a DHCP option should be set by the DHCP server when negotiating the IP address lease with the computing device, with the associated operand indicating which DHCP option should be set. The opcode GETOPT indicates that the DHCP server should extract the DHCP option from the response received from the computing device, and use the DHCP option as the DHCP server processes the negotiation with the computing device. The opcode OFFER indicates that the DHCP server should offer the address specified by the operand to the computing device. The opcode RETRIEVE indicates that the DHCP server should obtain an IP address lease from a remote host, with the associated operand indicating the port at which to reach the remote host. The opcode NOTIFY indicates that the DHCP server should notify a specific host, or optionally a plurality of hosts, of the IP address issued to the computing device, with the associated operands indicating which host or hosts to notify. The opcode AUTH indicates that the DHCP server should authenticate the computing device through another authentication system, with the associated operands indicating which protocol to use, the port at which the authentication system can be reached, and the authentication credentials provided by the computing device. The opcode PING indicates that the DHCP server should issue a ping to another host identified by the operand, to verify whether the IP address is in use. The opcode REDIR indicates that the DHCP server should redirect the lease negotiation to a different DHCP server, with the operand indicating which DHCP server should be included in the lease negotiation. The opcode RELEASE indicates that the DHCP server should release the mapping between a MAC address client identifier of the client device and an IP lease.

In executing the received indication of operations from the DHCP relay agent system 125, a DHCP server (such as a first or second server 130 or 140) may effectively perform the functions of a processor, virtual processor, or virtual machine. In examples, the opcodes SETVAR, GETVAR, REMOVE, and EXISTS all relate to the DHCP server's ability to manage variables in this role. These variables may be made available to the client computing device. The variables may be associated with rules provided to the DHCP server that may dictate the number of variables the client computing device is allowed, the length of time a variable may be stored by the DHCP server, or other rules or limitations related to the use of stored variables. The opcode SETVAR indicates that the DHCP server should assign a value to a variable name, both provided by the associated operands, and store the variable. The opcode GETVAR indicates that the DHCP server should retrieve the value of the variable indicated by the associated operand. The opcode REMOVE indicates that the DHCP server should remove the stored variable indicated by the associated operand. The opcode EXISTS indicates that the DHCP server should check for the existence of a variable whose name is provided by the operand. The opcode OUI is a Boolean expression that returns a value of true if the network card of the computing device is a product of a particular vendor. The supplied operand may be the name of the vendor or a portion of the client device MAC address, corresponding to the vendor identifier. The opcodes AND, OR, and NOT are opcodes for standard Boolean operations that are performed on the supplied operands. The opcode SUBSTR enables a DHCP server to extract a portion of an input string supplied by the operand. The opcode LENGTH allows the DHCP server to verify the length of a string supplied by the operand. The opcode IFF indicates that the DCHP server should perform a ternary IF operation, where the DHCP performs one action if the supplied expression is true, or the DHCP server performs an alternative action if the expression is false. The expression to be evaluated, and the actions to be performed are provided by the associated operands.

The described opcodes represent an example subset of a wide range of possible opcodes that may be available within the configuration information provided to the DHCP relay agent system 125. The opcodes may be transmitted to a DHCP server in a format other than that described above.

For example, the opcodes may be transmitted in hexadecimal format, as one or more bytes of information, or may be transmitted in some other coded format.

Use of the above opcodes and associated operands is now illustrated by way of example. In a first scenario, an IP address lease negotiation may be carried out as indicated by the following pseudocode, and described in detail further below. Line numbers are included for reference.

```
(1)     client -> relay-agent ->
IIF(OUI=apple)?OFFER=192.0.2.4/24:OFFER=198.51.100.4/24
(2)         SETOPT=150:203.0.113.5
(3)         AUTH=SAML:203.0.113.2*USER:TOKEN
(4)         NOTIFY=203.0.113.3
(5)         RELEASE=198.51.100.5/28
(6)         STORE=clark:superman
(7)         REMOVE=eviltwin
(8)         SIGNATURE/HMAC -> dhcpd
(9)     dhcpd -> AUTH_SERVER [203.0.113.2]
(10)    AUTH_SERVER [203.0.113.2] -> dhcpd
(11)    dhcpd -> OFFER=192.0.2.4/24 OPT150=203.0.113.5
[SIGNATURE/HMAC] -> relay-agent -> client
(12)    dhcpd -> {LEASE INFO} local-lease-db
(13)    dhcpd -> {LEASE INFO} NOTIFY_SERVER[203.0.113.3]
```

In line (1), a client device broadcasts an IP address request, which is received by a relay agent. In this example, the client device may be a first computing device 110 and the relay agent may be a DHCP relay agent system 125. Following receipt of the broadcast request, the DHCP relay agent system 125 appends an indication of operations (and associated parameters), and forwards the request and indication of operations to a DHCP server, which in this example may be a first server 130. The first operation to be performed by the first server 130 is to evaluate a ternary IFF opcode. If the OUI associated with the first computing device 110 indicates that the network interface card of the first computing device 110 is a product of Apple®, the first server 130 is instructed to extend a lease offer for IP address 192.0.2.4. If the OUI of the first computing device 110 indicates a different vendor, the first server 130 is instructed to extend a lease offer for IP address 198.51.100.4/24. In examples, another client device, such as second computing device 115, may receive an offer for a different IP address than first computing device 110, based on the recognized vendor.

In line (2), the first server 130 is instructed to set DHCP option 150:203.0.113.5 for transmission to the client (in this case, first computing device 110). In line (3), the first server 130 is instructed to authenticate the first computing device 110 with an authentication server at address 203.0.113.2 using the SAML authentication protocol. The operand may also include a username and token supplied by the first computing device 110 to be used to authenticate the first computing device 110. In other examples, other authentication methods may be used to verify that first computing device 110 is an authorized client on the network. In this example, the authentication server may be an auth system 170 operatively connected to network 160.

In line (4), the first server 130 is instructed to notify a host at address 203.0.113.3 once the IP address lease has been issued. In line (5), the first server 130 is instructed to release address 198.51.100.5/28, which may be in use by a particular client device (such as by the second computing device 115). In line (6,) the first server 130 is instructed to store the string value 'superman' as a variable named 'dark.' The variable would then be available to the first computing device 110 as needed. In line (7), the first server 130 is instructed to remove the variable named 'eviltwin.' In line (8), the first server 130 is instructed to validate that the received indication of operations and forwarded IP address request has been sent by a trusted DHCP relay agent system 125 on the network, prior to executing the indication of operations. The first server 130 is instructed to use the hash-based message authentication code (HMAC) authentication methodology to perform this validation.

In line (9), the first server 130 begins performing the received indication of operations. The first server 130 (indicated as "dhcpd" in the pseudocode) has determined the result of the IFF operation and has set the DHCP option according to the indication of operations. The first server 130 provides the authentication credentials it received (username and token) to the AUTH SERVER at 203.0.113.2 using SAML. In this example, the AUTH SERVER may be an auth system 170. In line (10), the auth system 170 informs the first server 130 whether the authentication was successful. If the authentication is not successful the lease negotiation process is terminated, if the authentication process is successful the lease negotiation process continues.

In line (11), the first server 130 extends a lease offer for IP address 192.0.2.4/24, indicating that the first server 130 recognizes the MAC address of the first computing device 110 as being associated with an Apple® product. The first server 130 sets DHCP option 150:203.0.113.5, and signs the transaction according to the HMAC authentication methodology. The lease offer is then transmitted to the DHCP relay agent system 125, which validates the HMAC signature of the first server 130, and forwards the lease offer to the first computing device 110. The DCHP relay agent system 125 will then continue to relay information between the first computing device 110 and first server 130 to complete the remainder of the lease negotiation process via a typical DORA process.

In line (12), following the completion of the lease negotiation, the first server 130 forwards information about the lease to a local lease database, such as lease database 170. In line (13), the first server 130 sends a copy of the lease information to IP address 203.0.113.3, per the NOTIFY opcode within the indication of operations. In examples, this notification may be used as part of a backup lease database, for performing a lease audit, for centralizing lease monitoring, or for a range of other lease management functions.

In a second scenario, an IP address lease negotiation may be carried out as indicated by the following pseudocode, and described in detail further below. Line numbers in the pseudocode are incremented to avoid confusion with the first scenario, and are included for reference.

```
(20)    client -> relay-agent ->   NODB AUTH=9.9.9.9
(21)                                RETRIEVE=203.0.113.3
(22)                                NOTIFY=203.0.113.3
(23)                                SIGNATURE/HMAC -> dhcpd
(24)    dhcpd -> AUTH_SERVER [9.9.9.9]
(25)    AUTH_SERVER [9.9.9.9] -> dhcpd
(26)    dhcpd -> {LEASE REQUEST FOR
MACADDR/CLIENT_IDENTIFIER} LEASE_SERVER [203.0.113.3]
(27)    LEASE_SERVER [203.0.113.3] -> {LEASE INFO} dhcpd
(28)    dhcpd -> OFFER=192.0.2.4/24 [SIGNATURE/HMAC] ->
        relay-agent -> client
(29)    dhcpd -> {LEASE INFO} NOTIFY_SERVER [203.0.113.3]
```

In line (20), a client device broadcasts an IP address request, which is received by a relay agent. In this example, the client device may be a second computing device 115 and the relay agent may be a DHCP relay agent system 125. Following receipt of the broadcast request, the DHCP relay agent system 125 appends an indication of operations (and associated parameters), and forwards the request and indication of operations to a DHCP server, which in this example may be a first server 130. The first opcode, NODB, indicates that the first server 130 should not use a local lease database that the first server 130 may be using to issue IP address leases. The first server 130 is instructed to authenticate the second computing device 115 with an authentication server at address 9.9.9.9. Since the authentication protocol is not provided in this example, the auth system 170 (which in this example includes a server advertising IP address 9.9.9.9) will use default DHCP authentication mechanism built into the DHCP protocol.

In line (21) the first server 130 is instructed to retrieve the IP lease from a remote server at 203.0.113.3. In this example, the server at IP address 203.0.113.3 may comprise lease database 150. The first server 130 will then complete the lease negotiation process with this retrieved lease. In line (22), the first server 130 is instructed to send a copy of lease information for the completed lease negotiation to the remote server at 203.0.113.3. The operations of lines (21) and (22) may indicate the use of a remote lease database or other centralized lease management resource.

In line (23), the first server 130 is instructed to validate that the received indication of operations and forwarded IP address request has been sent by a trusted DHCP relay agent system 125 on the network, prior to executing the indication of operations.

In line (24), the first server 130 begins execution of the received indication of operations. The first server 130 (indicated as "dhcpd" in the pseudocode) communicates with the auth system 170 to perform the authentication. In line (25) The auth system 170 informs the first server 130 whether the authentication was successful. If the authentication is not successful the lease negotiation process is terminated, if the authentication process is successful the lease negotiation process continues.

In line (26), the first server 130 requests an IP address from the remote server at 203.0.113.3 (e.g., lease database 150). In line (27), the remote server at 203.0.113.3 responds to the request of the first server 130 by providing the IP address lease information to the first server 130 to forward to the second computing device 115.

In line (28), the first server 130 signs the transaction according to the HMAC authentication methodology and transmits the IP lease offer to the DHCP relay agent system 125, which validates the HMAC signature and forwards the lease offer to the second computing device 115. The DCHP relay agent system 125 will then continue to relay information between the second computing device 115 and first server 130 to complete the remainder of the lease negotiation process via the typical DORA process.

In line (29), the first server 130 sends a copy of the lease information to IP address 203.0.113.3, per the NOTIFY opcode within the indication of operations. In examples, this notification may be used as part of a backup lease database, for performing a lease audit, for centralizing lease monitoring, or for a range of other lease management functions.

In examples, the above scenarios illustrate certain advantages of the present technology. The DHCP relay agent system 125 may be provided with configuration information that describes how to process and forward DHCP address requests for every device connected to the DHCP relay agent system 125 via network 120. Based on the provided configuration information and any other information or parameters which may be available to the DHCP relay agent system 125, the DHCP relay agent system 125 determines the indication of operations and associated parameters (such as opcodes and operands) needed to process the IP address request. This determination may require minimal computational activity on the part of the DHCP relay agent system 125, since the configuration information or other information requires minimal decision-making or processing on the part of the DHCP relay agent system 125. Further, minimal decision-making is required by the DHCP server (such as first or second server 130 or 140), since the DHCP server simply executes a set of operations it receives from the DHCP relay agent system 125. In some examples, the DHCP server may effectively act as a processor, virtual processor, or virtual machine, where the DHCP server's role in the process of IP address lease negotiation is pre-defined by the configuration information and requires little autonomous decision-making by the DHCP server.

While FIG. 1 depicts an example computer network system 100 with two computing devices, two DHCP servers, and a single DHCP relay agent system, the concepts described herein are not limited to such systems. For example, multiple DHCP relay agent systems may be deployed, and a large plurality of client computing devices may be connected to the multiple DHCP relay agent systems. In further examples, the multiple DHCP relay agent systems and large plurality of client computing devices may be connected to a more extensive network of interconnected DHCP servers and other network resources. The concepts described herein may be especially effective as computer network systems scale up, and may significantly reduce the aforementioned burden placed on DHCP servers in such large, more complex computer networks systems.

Figure 2:
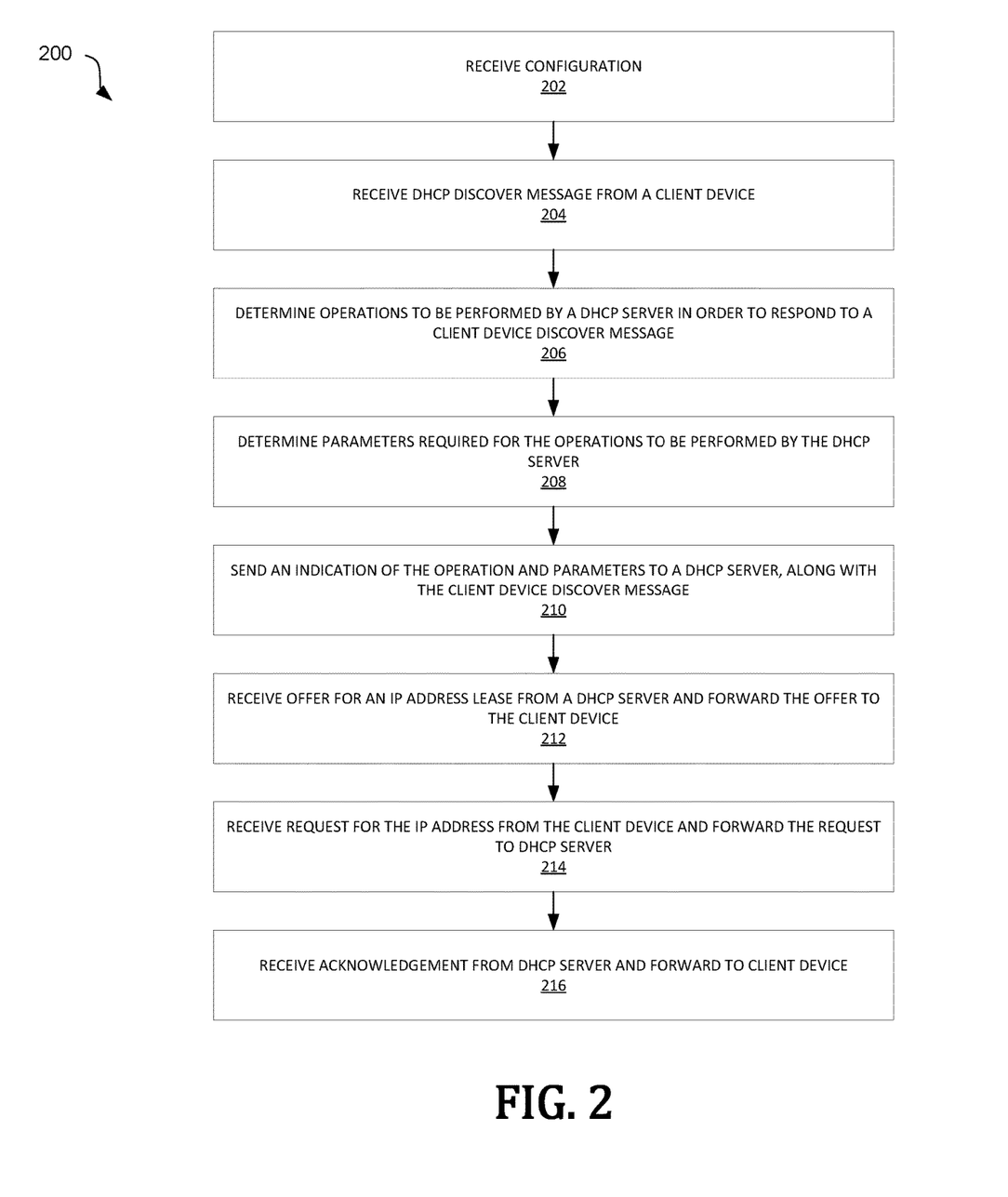
FIG. 2 depicts an example method in which aspects of the present technology may be practiced by a DHCP relay agent system.

FIG. 2 depicts an example method 200. In examples, some or more of the operations of method 200 may be performed by a DHCP relay agent system, such as DHCP relay agent system 125, or elements thereof. At operation 202, the DHCP relay agent system receives configuration information. For example, DHCP relay agent system 125 may receive configuration information through an administrator user interface, programmatically from a data store or other computing device, or otherwise. The configuration information comprises information that the DHCP relay agent system may use when forwarding an IP address request from a client computing device (e.g., first or second computing device 110 or 115) to a DHCP server (e.g., first server 130 or second server 140). For example, the configuration information may include information about the IP addresses available to first computing device 110 and/or second computing device 115 and how those IP addresses should be assigned to a client computing device having the characteristics of first computing device 110 and/or second computing device 115, respectively.

The configuration information may further include a description or list of operations to be performed by a DHCP server as it responds to the IP address request. The description or list of operations may include actual executable instructions. For example, the configuration information may contain a list of opcodes and associated operands that the DHCP relay agent system will forward to the DHCP server for execution. Examples of these opcodes, associated operands, and related operations (such as Boolean operations), and example scenarios for how these opcodes and operands may be used are described in detail above in relation to FIG. 1.

The configuration may be received by the DHCP relay agent system during its initialization or at any time during operation. The configuration may be transmitted to the DHCP relay agent system by an automated process from another computing resource operatively connected to the relay agent system. In other examples, the configuration may be transmitted to the DHCP relay agent system interactively by a network system administrator. Similarly, the configuration may be updated dynamically, in whole or part, via automated process or by action of a network system administrator.

At operation 204 the DHCP relay agent system receives a DHCP discover message broadcast from a client computing device, indicating a request for an IP address. For example, the DHCP relay system 120 may receive a DHCP discover message from first computing device 110. At operation 206, the DHCP relay agent system determines which operations should be performed by a DHCP server in order to respond to the discover message from the client computing device. This determination is based on the DHCP relay agent system's configuration information and may informed by additional factors. For example, the DHCP relay agent system 125 may determine which operations should be performed by a DHCP server (e.g., first server 130 and/or second server 140) based on the virtual local area network (VLAN) or port that the client computing device (e.g., first computing device 110) uses to connect to the DHCP relay agent system, the MAC address of the client computing device, or otherwise. In other examples, the DHCP relay agent system may consider the number of remaining addresses, which addresses remain, or other factors when determining which operations should be performed by the DHCP server. The determined operations may be a plurality of operations, a single operation, or an indication that no operations should be performed. In addition, operations may be joined by Boolean operators, such as AND, OR, NOT, IFF, etc.

At operation 208, based on its configuration and the determined operations, the DHCP relay agent system further determines which parameters are required for the operations to be performed by the DHCP server. For example, based on its configuration and the determined operations, the DHCP relay agent system 125 further determines which parameters are required for the operations to be performed by the DHCP server (e.g., first server 130 and/or second server 140). Examples of such parameters may include, but are not limited to, operands, IP addresses, DHCP options or sub-options, network hosts, network ports, variables, constants, or authentication tokens or other credentials.

At operation 210, the DHCP relay agent system transmits an indication of operations and associated parameters to a DHCP server, along with the client device discover message. For example, the DHCP relay agent system 125 may transmit an indication of operations and associated parameters to first server 130 (through network 160), along with the DHCP discover message from first computing system 130. In one example, the relay agent option (option 82) defined in the DHCP protocol may be extended, wherein a new sub-option may include a transmission mechanism for the indication of operations and associated parameters. In other examples, the indication of operations and associated parameters may be transmitted to a DHCP server through another mechanism.

In some examples, the indication of operations may be actual executable code, such as one or more of the opcodes and associated operands discussed herein. In other examples, the indication of operations may inform a DHCP server about which operations to execute, and the actual executable code may then be accessed by the DHCP server through some other computer resource. For example, the executable code may be pre-stored locally on the DHCP server (such as the first or second server 130 or 140) or stored elsewhere on one or more device(s) that are operatively connected to the DHCP server. Additionally or alternatively, the DHCP relay agent system may also pass along upstream network information that is added by upstream switches or other network devices (such as those associated with network 120) that may be relevant to an IP address determination. After receipt of the indication of operations, the DHCP server may then retrieve and execute the indicated operations.

At operation 212, the DHCP relay agent system receives an offer for an IP address lease from a DHCP server and forwards the offer to the client computing device. For example, the DHCP relay agent system 125 may an offer for an IP address lease from a first server 130 and forward the offer to the first computing device 110. In examples, the lease offer is received by the DHCP relay agent system following execution of the operations by the DHCP server.

At operation 214, the DHCP relay agent system receives a request from the client computing device for the offered IP address and forwards the request to the DHCP server that made the lease offer. For example, the DHCP relay agent system 125 may receive a request from the first computing device 110 for the offered IP address and forward the request to the first computing device 130 that made the lease offer.

At operation 216, the DHCP relay agent system receives an acknowledgement from the DHCP server and forwards the acknowledgement to the client computing device, thereby completing the DHCP DORA process. For example, the DHCP relay agent system 125 may receive an acknowledgement from the first server 130 and forward the acknowledgement to the first computing device 110, thereby completing the DHCP DORA process.

Figure 3:
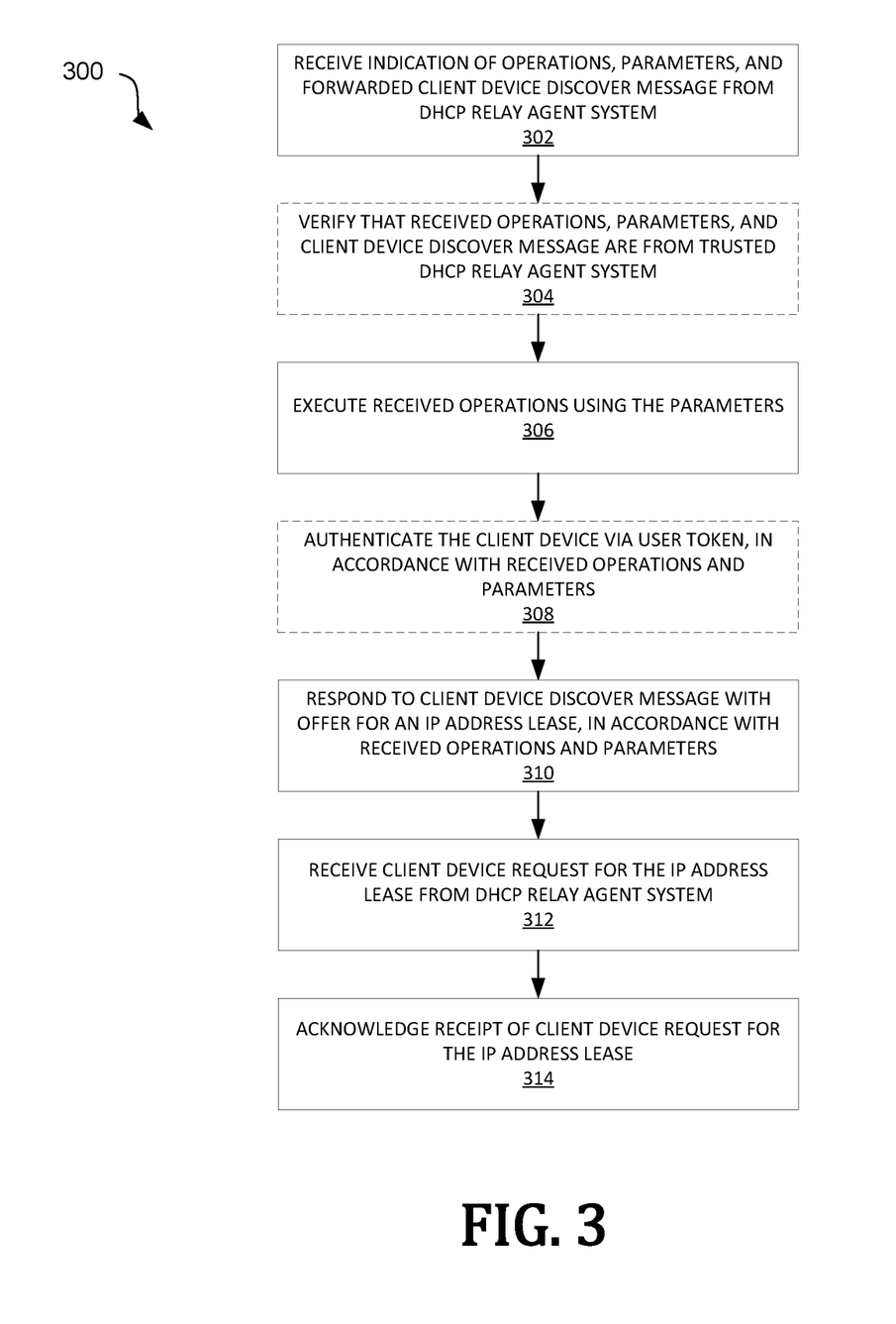
FIG. 3 depicts an example method in which aspects of the present technology may be practiced by a DHCP server.

FIG. 3 depicts an example method 300. In examples, some or all of the operations of method 300 may be performed by a DHCP server, such as first server 130, or elements thereof.

At operation 302 the DHCP server receives an indication of operations, associated parameters, and a forwarded client computing device discover message from a DHCP relay agent system, such as DHCP relay agent system 125. In examples, the transmitted information from the DHCP relay agent system may be received by the DHCP server via the anycast routing methodology executed by network 160. As described, the indication of operations may be executable code, such as opcodes, or may be information about the operations to be performed, where the DHCP server will then retrieve and execute the indicated operations. Examples of associated parameters may include, but are not limited to, operands, IP addresses, DHCP options or sub-options, network hosts, network ports, variables, constants, or authentication tokens or other credentials.

At operation 304, the network system may be configured such that the DHCP server is required to verify the authenticity of a DHCP relay agent system, before acting on received communications from the DHCP relay agent system. For example, first server 130 may verify that the received message is from a known or trusted DHCP relay agent system 125. For example, the DHCP server and DHCP relay agent system may employ a signature-based authentication method. In other examples, the DHCP server and DHCP relay agent system may employ a shared secret-based authentication mechanism, such as hash-based message authentication code (HMAC), or other method.

At operation 306, the DHCP server executes the indicated operations using any associated parameters received from the DHCP relay agent system. For example, the first server 130 may execute the indicated operations using the associated parameters received from DHCP relay agent system 125. As previously described, the received operations may indicate a plurality of operations, a single operation, or an indication that no operations should be performed by the DHCP server. Examples of operations that may be executed by the DHCP server in the process of issuing a lease offer may include, but are not limited to: assigning specific IP addresses to client devices, specifying that a lease database be used, setting DHCP options or sub-options, notifying one or more third-party DHCP servers about an offered lease, releasing specific IP addresses for use by other client computing devices, storing variables or other parameters for general-purpose use, performing Boolean or other logic operations, evaluating conditional statements (such as ternary IFF statements), or any of a range of potential operations that may be necessary in the issuance of an IP address lease offer. The table of opcodes and example scenarios described above in relation to FIG. 1 provide specific examples of possible operations that may be executed by a DHCP server.

In some examples, the DHCP server may effectively act as a processor, virtual processor, or virtual machine, where the DHCP server's role in the process of IP address lease negotiation is pre-defined by the configuration information and requires little autonomous decision-making by the DHCP server.

At operation 308, the received operations may direct the DHCP server to authenticate the client computing device before extending an IP address lease offer. In some examples, the operations may direct the DHCP server, such as a first server 130, to authenticate the client computing device (e.g., first computing device 110) with a specific remote server, such as an auth system 170. In still other examples, the parameters associated with the operations may provide authentication credentials to the DHCP server. For example, the received parameters may include a username and password to be verified by a remote authentication server. In other examples, the received parameters may provide a user token, a list of access permissions, or other forms of security credentials or controls.

At operation 310, the DHCP server responds to the client computing device discover message with an offer for an IP address lease. For example, first server 130 may respond with an IP address lease offer. The DHCP server may issue this offer in accordance with the received operations and associated parameters. In some examples, the DHCP server (such as first or second server 130) may directly assign an IP address based on the received indication of operations. In other examples, the received indication of operations may direct the DHCP server to communicate with another server (such as second server 140), or to communicate a local or remote lease database (such as lease database 150) in assigning the IP address. In still other examples, the DHCP server may serve as a proxy for another server or lease database in the lease negotiation process.

At operation 312, in response to the offered IP address lease, the DHCP server receives a client computing device request for the lease, forwarded from the DHCP relay agent system. For example, first server 130 may receive a request for the lease from first computing device 110 (forwarded by DHCP relay agent 125). At operation 314, the DHCP server transmits an acknowledgement of the client device request for the lease, which is forwarded by the DHCP relay agent system to the client computing device. For example, the first server 130 may transmit an acknowledgement of the lease to the DHCP relay agent system 125. Operation 314 completes the DHCP DORA process with an IP address lease assigned to the client computing device.

Figure 4:
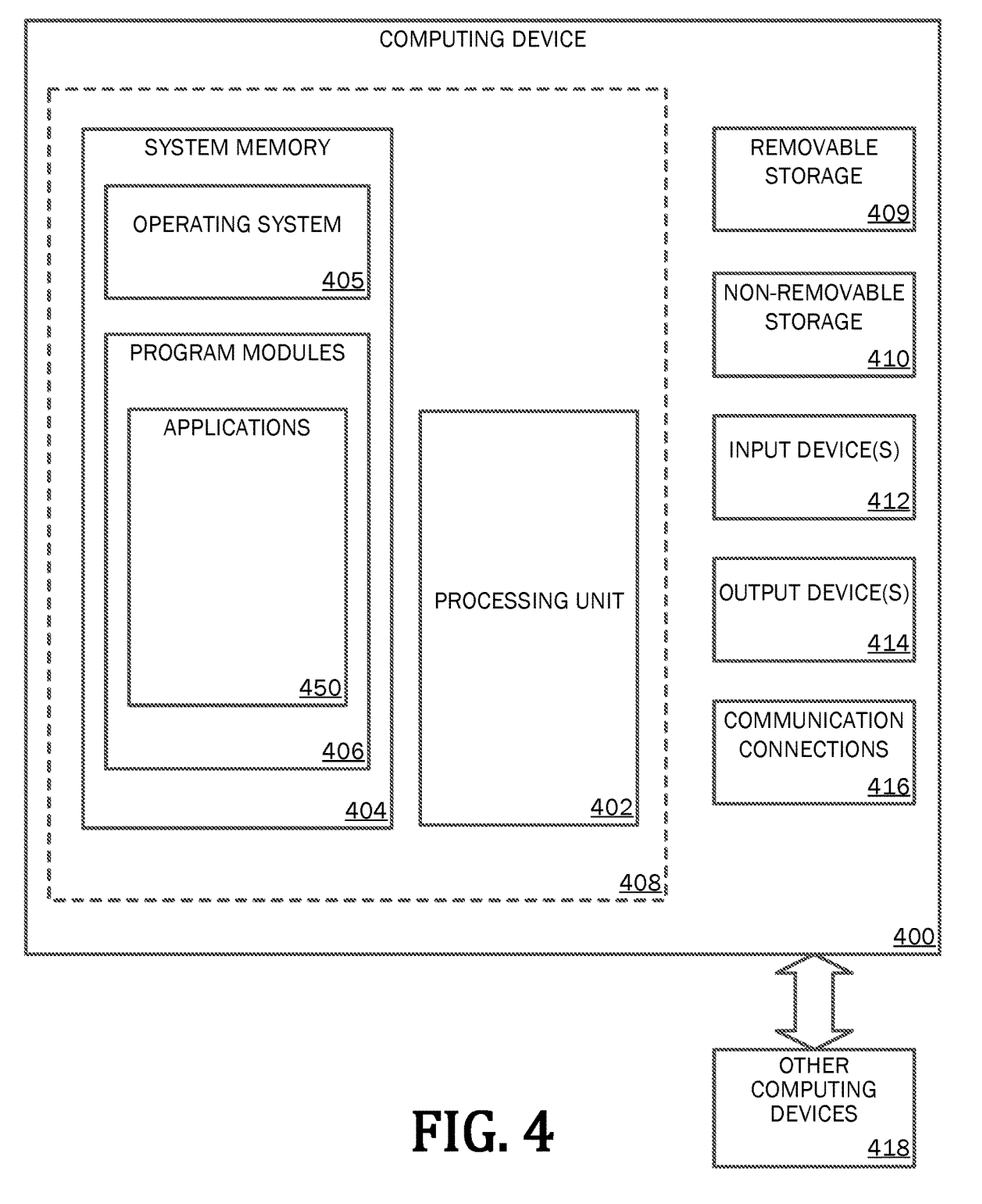
FIG. 4 is a block diagram illustrating example physical components of a computing device with which aspects of the present technology may be practiced.

FIG. 4 is a block diagram illustrating physical components (i.e., hardware) of a computing device 400 with which examples of the present disclosure may be practiced. The computing device components described below may be suitable for one or more of the components of the system 100, such as the first computing device 110, second computing device 115, DHCP relay agent system 125, first server 130, second server 140, lease database 150, auth system 170 and/or one or more of the components of network 120 and/or network 160. In a basic configuration, the computing device 400 may include at least one processing unit 402 and a system memory 404. The processing unit(s) (e.g., processors) may be referred to as a processing system. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450.

The operating system 405, for example, may be suitable for controlling the operation of the computing device 400. Furthermore, aspects of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the operations of the methods illustrated in FIG. 2 or FIG. 3. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. In examples, computer storage media is tangible and nontransitory, does not communication media, and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Those skilled in the art will recognize that the methods and systems of the present disclosure may be implemented in many manners and as such are not to be limited by the foregoing aspects and examples. In other words, functional elements being performed by a single or multiple components. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. A method, comprising:
   receiving, at a dynamic host configuration protocol (DHCP) relay agent system, configuration information for the DHCP relay agent system;
   receiving, at the DHCP relay agent system, a DHCP discover message from a client device;
   determining, by the DHCP relay agent system and based on the configuration information, operations to be performed by a first DHCP server in order to respond to the discover request and parameters for the operations;
   sending an indication of the operations and the parameters to at least the first DHCP server;
   receiving, from the first DHCP server, an offer for an internet protocol (IP) address from the first DHCP server;
   forwarding the offer to the client device;
   receiving, from the client device, a request for the IP address;
   receiving an indication of a lease for the IP address; and
   forwarding the indication of the lease to the client device.

2. The method of claim 1, wherein the operations and the parameters comprise instructions to the first DHCP server for how to generate the offer.

3. The method of claim 2, wherein the instructions comprise one of the IP address or identification of another DHCP server from which the first DHCP server should obtain the IP address.

4. The method of claim 2, wherein the instructions comprise a first IP address to be used for the offer if a condition is true and second IP address to be used for the offer if the condition is false.

5. The method of claim 2, wherein the instructions further comprise identification of a server to notify after the lease is provided to the client device.

6. The method of claim 2, wherein the instructions further comprise a user token for the client device and an indication of a server at which to authenticate the user token.

7. The method of claim 2, wherein the instructions further comprise an indication to release an earlier lease for the client device.

8. The method of claim 1, wherein the indication of the operations and the parameters comprises a message that is signed using a secret shared between the DHCP relay agent system and the first DHCP server.

9. The method of claim 1, wherein indication of the operations and the parameters is sent in a message to an Anycast address served by the first DHCP server and by at least a second DHCP server.

10. A method, comprising:
    receiving, at a first dynamic host configuration protocol (DHCP) server, a DHCP client device discover message from a DHCP relay agent system;

receiving, at the first DHCP server, an indication of operations to be performed by the first DHCP server, and parameters associated with the operations, from the DHCP relay agent system;

executing, by the first DHCP server, the operations using the parameters; and responding to the received client device discover message with an offer for an internet protocol (IP) address lease, based on executing the operations.

11. The method of claim 10, wherein the indication comprises executable instructions for how to generate the IP address lease offer, the method further comprising:

prior to performing the executable instructions, verifying by the first DHCP server that the DHCP relay agent system is a trusted resource on the network.

12. The method of claim 10, wherein the indication further comprises a user token for the client device and an indication of a server at which to authenticate the user token.

13. The method of claim 10, wherein the indication further comprises one of the IP address or identification of another server from which the first DHCP server should obtain the IP address.

14. The method of claim 10, wherein the indication further comprises a first IP address to be used for the offer if a condition is true and second IP address to be used for the offer if the condition is false.

15. The method of claim 10, wherein the indication further comprises identification of a server to notify after the lease is provided to the client device.

16. A system, comprising:

at least one processor; and memory, operatively connected to the at least one processor and storing instructions that, when executed by the at least one processor, cause the system to perform operations comprising:

receiving configuration information at a dynamic host configuration protocol (DHCP) relay agent;

receiving, by the DHCP relay agent, a DHCP discover message from a client device;

determining, by the DHCP relay agent and based on the configuration information, operations to be performed by a DHCP server in order to respond to the discover request;

determining parameters associated with the operations;

sending, by the DHCP relay agent, an indication of the operations and the parameters to at least a first DHCP server;

receiving, by the DHCP relay agent, an offer for an internet protocol (IP) address from the first DHCP server;

forwarding, by the DHCP relay agent, the offer to the client device;

receiving, from the client device, a request for the IP address;

receiving, by the DHCP relay agent, an indication of a lease for the IP address; and forwarding, by the DHCP relay agent, the indication of the lease to the client device.

17. The system of claim 16 wherein the operations and the parameters comprise instructions to the first server for how to generate the offer.

18. The system of claim 17 wherein the instructions comprise one of the IP address or identification of another server from which the first server should obtain the IP address.

19. The system of claim 17 wherein the instructions further comprise identification of a server to notify after the lease is provided to the client device.

20. The system of claim 17 wherein the instructions further comprise a user token for the client device and an indication of a server at which to authenticate the user token.

* * * * *